United States Patent [19]
Kolka

[11] Patent Number: 5,580,089
[45] Date of Patent: Dec. 3, 1996

[54] VEHICLE STABILIZATION SYSTEM AND METHOD

[76] Inventor: David B. Kolka, 1110 N. Walnut St., Bay City, Mich. 48706

[21] Appl. No.: 320,923

[22] Filed: Oct. 11, 1994

[51] Int. Cl.⁶ ............................................ B62D 9/02
[52] U.S. Cl. ................. 280/772; 280/112.2; 280/661
[58] Field of Search .................................. 280/661, 772, 280/112.2, 693, 698, 673

[56] References Cited

U.S. PATENT DOCUMENTS

| | | | |
|---|---|---|---|
| 3,704,027 | 11/1972 | Laudadio | 280/772 |
| 3,751,061 | 8/1973 | Scheuerpflug | 280/661 |
| 4,373,743 | 2/1983 | Parsons, Jr. | 280/661 |
| 4,546,997 | 10/1985 | Smyers | 280/772 |
| 4,700,972 | 10/1987 | Young | 280/661 X |
| 5,082,306 | 1/1992 | Khavkin | 280/661 |
| 5,094,472 | 3/1992 | Oyama et al. | 280/661 |
| 5,116,069 | 5/1992 | Miller | 280/112.2 |

*Primary Examiner*—Robert J. Oberleitner
*Assistant Examiner*—Peter M. Poon
*Attorney, Agent, or Firm*—Learman & McCulloch

[57] ABSTRACT

The vehicle stabilization system includes a frame (13) supported by wheel support assemblies (10). Each wheel support assembly includes a guide beam assembly (38), a transfer box (70) and a tire and wheel (104) attached to the transfer box by a lower yoke (80), an upper yoke (80) and a suspension spring. A cylinder (162) moves the transfer box (70) relative to the guidebeam assembly (38) to raise and lower the frame (12). A cylinder (168) pivots the guide beam assembly (38) about the axis of a king pin (40) to adjust the camber of a wheel and tire. When the vehicle travels around a curve, cylinders (162) tilt the frame (12) to shift the vehicle center of gravity and the cylinders (168) adjust wheel camber as required.

19 Claims, 5 Drawing Sheets

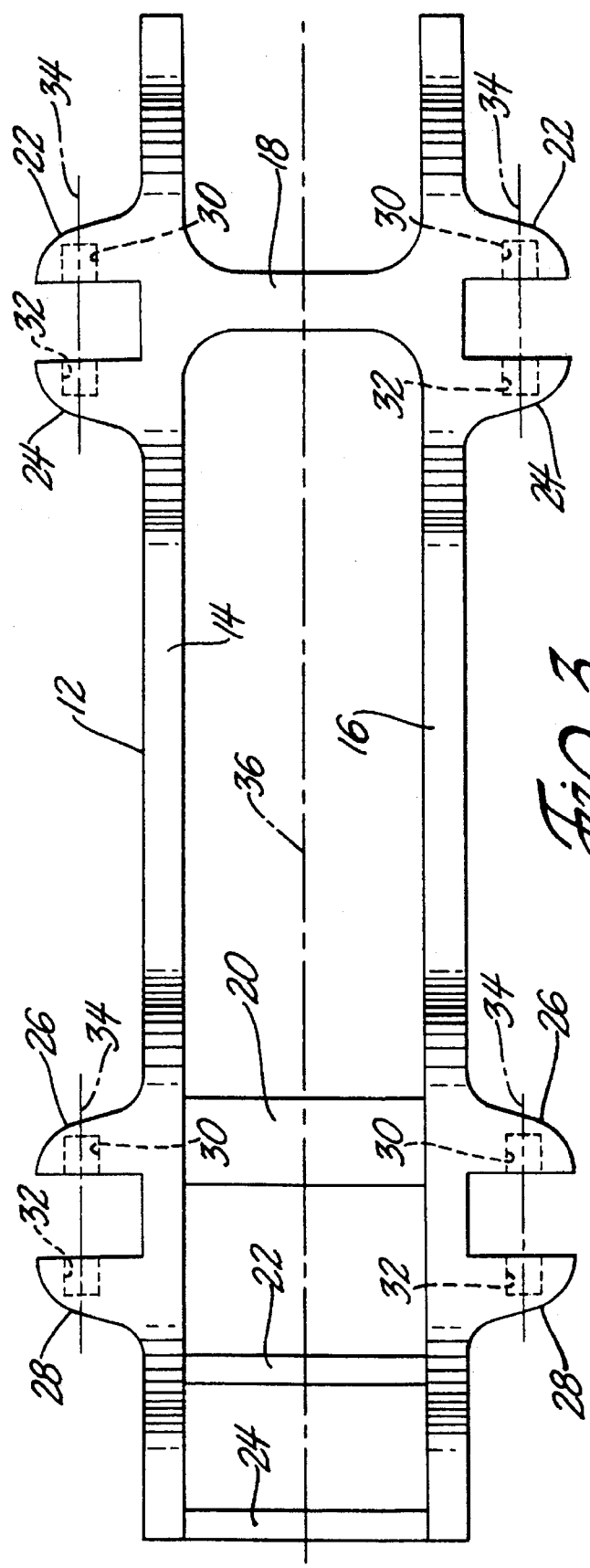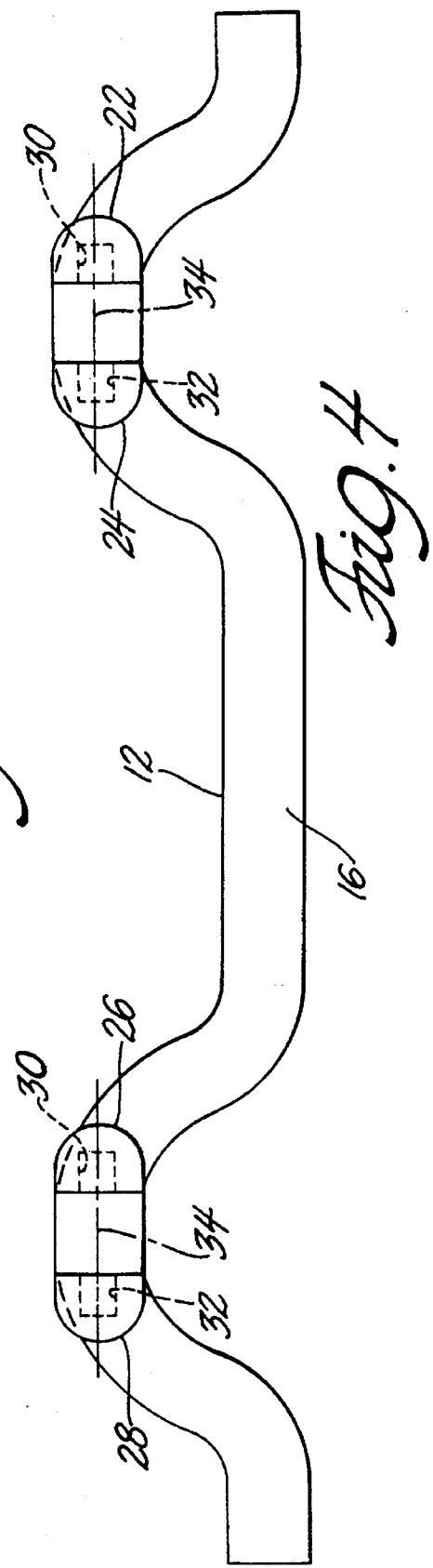

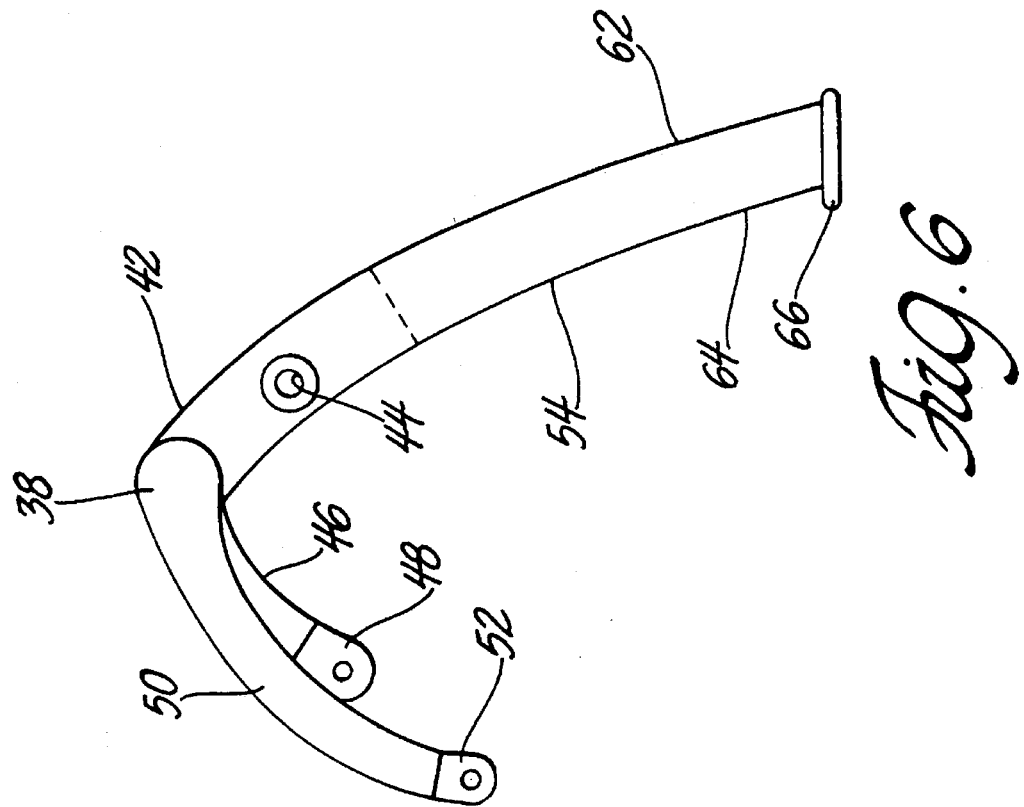
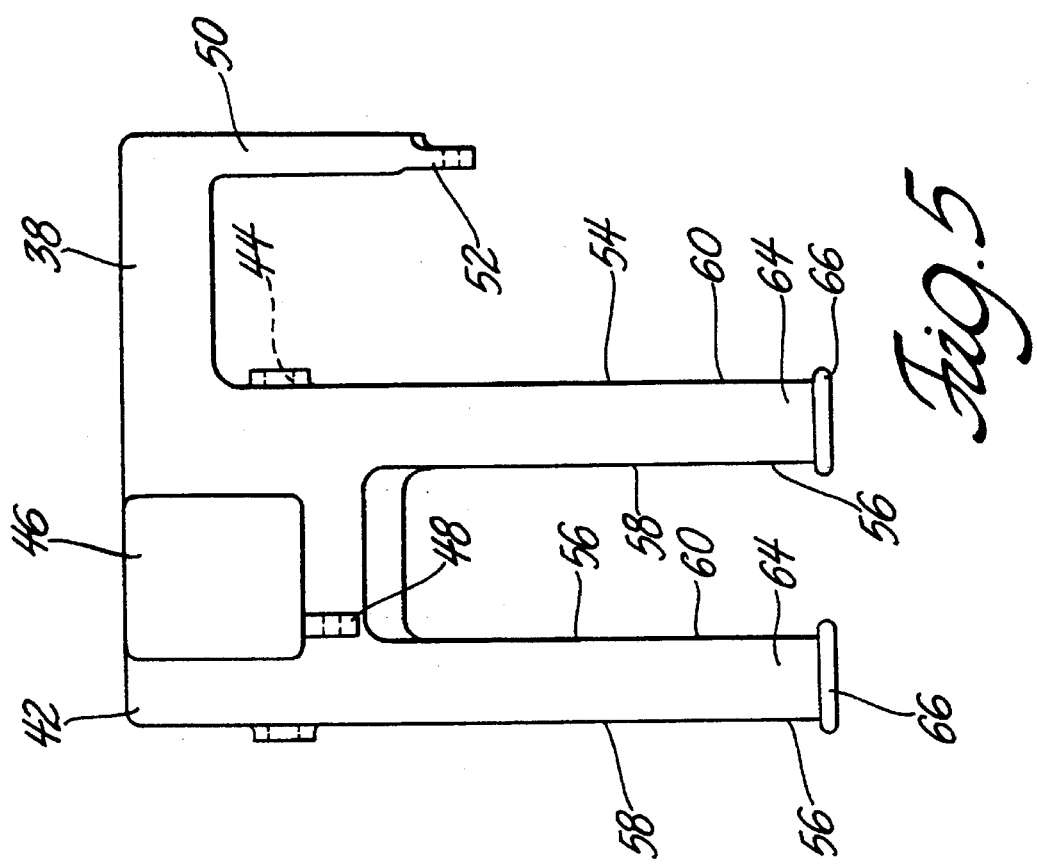

5,580,089

VEHICLE STABILIZATION SYSTEM AND METHOD

TECHNICAL FIELD

This invention is in a system and method for improving vehicle stability while turning and more particularly in a system that tilts a vehicle body and shifts the center of gravity toward the inside of a turn and which changes the camber of wheels and tires to maintain proper contact between tire treads and a road surface.

BACKGROUND OF THE INVENTION

The body of a motor vehicle with a spring suspension system tends to roll toward the outside during a turn. The roll lifts the side of the vehicle on the inside of a turn and lowers the side of the vehicle on the outside of a turn. This results in shifting the vehicle center of gravity toward the outside of a turn and shifting weight from the vehicle wheels on the inside of a turn. The body roll can also raise the center of gravity. As vehicle speed increases, centrifugal force effectively acting on the center of gravity of the vehicle will shift even more weight from the tires and wheels on the side of the vehicle on the inside of a turn to the tires and wheels on the side of the vehicle on the outside of a turn. If too much weight is removed from the tires and wheels on the side of a vehicle that is on the inside of a turn, the driven tire and wheel on that side of the vehicle will loose traction and spin. In the event that even more weight is transferred from the tires and wheels on the side of the vehicle that is on the inside of a turn, these tires can leave a road surface and the vehicle can roll over on its top.

High performance vehicles, such as racing vehicles, are designed with a low center of gravity. The low center of gravity substantially reduces weight transfer from the tires on one side to the tires on the other side. A stiff suspension system and stabilizer bars reduce body roll and further reduce the tendency of a vehicle to roll over.

A low center of gravity and a stiff suspension system will substantially reduce the tendency of a vehicle to roll over in a turn. When a high performance vehicle attempts to negotiate a turn at a speed which is too high, a driven wheel on the side of the vehicle on the inside of a turn starts to spin as the tire's ability to transfer torque from the engine to the road surface decreases. The coefficient of friction between a vehicle tire and a road surface when a tire is in sliding contact is substantially less than it is when a tire is in rolling contact with a surface. As a result, once the driven tire starts to spin, the frictional force exerted on the tires by the road is insufficient to keep the driven tires on both sides of a vehicle from sliding sideways. When the tires start to slide sideways, the vehicle will spin unless the driver can react quickly to stabilize the vehicle.

Efforts are constantly under way to improve the stability of race cars. If stability can be improved, speed can be increased, and races can be won. Increasing stability in passenger vehicles can reduce roll-overs and spin-outs.

SUMMARY OF THE INVENTION

An object of the invention is to shift weight to tires and wheels on the side of a vehicle on the inside of a turn.

Another object of the invention is to lower the center of gravity of a vehicle during changes in the vehicle's direction of travel.

A further object of the invention is to adjust the camber of wheels and tires as required to maintain contact between a road surface and tire treads, to maintain traction, and to prevent spins.

The center of gravity of a vehicle is preferably shifted toward the side of a vehicle that is on the inside of a turn by lowering the side of the vehicle that is on the inside of a turn. Lowering one side of the vehicle tilts the vehicle frame toward the inside of a turn and also lowers the center of gravity. Tilting the frame toward the inside of a turn to shift the center of gravity toward the side of a vehicle on the inside of a turn can also be accomplished by raising the side of the frame that is on the outside of a turn. If the vehicle frame is close to the road surface when the vehicle is traveling in a straight line, it may be necessary to tilt the vehicle frame by raising the outside, rather than lowering the inside, of the vehicle. Unfortunately, tilting the frame by raising one side has the undesirable effect of raising the center of gravity slightly. Generally, an increase in the height of the vehicle center of gravity has less effect on vehicle stability than the effect of shifting the center of gravity toward the inside of a turn. With some vehicle configurations the frame could be tilted by raising one side of the frame and lowering the other side. Such a system would most likely avoid raising the center of gravity unless one side of the frame is lowered much less than the other side is raised.

The frame can be tilted in a number of different ways. It is important to ensure that the procedure employed to tilt the frame does not prevent the suspension from performing its function. The tires and wheels must be able to follow the variations in a road surface while keeping all tires in contact with the road surface as much of the time as possible. The suspension system should also tend to equalize the pressure exerted on the road surface by each tire and wheel. If the right front and the left rear tires are both on high spots on a road surface, the left front and the right rear should still support a substantial portion of the vehicle's weight. Conventional suspension systems generally accommodate such transfers of weight and will do so when a frame is tilted if the frame tilting mechanism does not interfere with the suspension system.

The ability of a vehicle tire to attain and maintain rolling contact with a road surface, propel the vehicle and avoid sliding contact depends upon the tread of the tire making proper contact with the road surface. The tire treads are most efficient if each tire and wheel has the proper camber. The proper camber depends upon a large number of factors. The camber which works most efficiently is normally determined by the manufacture of a vehicle. On racing vehicles camber may be adjustable. The proper amount of camber can change with changes in such factors as the road surface and the tires used on the vehicle.

Tilting the frame of a vehicle from one side to the other will change the camber of at least some of the tires and wheels. To correct the camber during turns it is necessary to provide for camber adjustment during turns. The vehicle frame tilt system can be designed so that the camber of the tires and wheels on one side of the frame remain substantially unchanged during frame tilting. The tires and wheels on the other side of the vehicle will have be provided with a camber adjustment. The most satisfactory system provides for camber adjustment of all tires and wheels. A camber adjustment system adjusts the spacing between tires and wheels on opposite sides of a vehicle. Accommodating changes in the spacing between tires and wheels on opposite sides of a vehicle introduces some complexity. If a conventional mechanical drive is employed to drive two tires and wheels, the drives from the differential to each wheel will need to accommodate variations in angle and the distance between the differential and each wheel spindle. The steering system must also accommodate such variations. The drive to the wheels and the steering system do not form part of this invention and are not, therefore, disclosed in detail. The drive could include electric motors on each wheel or a fixed differential with constant velocity joints in a shaft with a length adjustment slip joint connecting each differential output to a wheel spindle, for example. The steering system could include separate linear actuators connected to each steered wheel and an electronic feed back and control system to keep the steered wheels in the proper position relative to each other. The steering system could also transmit rotary motion to each wheel and convert the rotary motion into a wheel spindle turning force. The rotatable shaft going to each wheel spindle could accommodate length changes as well as angular changes.

The foregoing and other objects, features, and advantages of the present invention will become apparent in the light of the following detailed description of an exemplary embodiment thereof that is illustrated in the accompanying drawings.

BRIEF DESCRIPTION OF THE DRAWINGS

FIG. 3 is a plan view of the vehicle frame;

FIG. 4 is a side elevational view of the vehicle frame;

FIG. 5 is a side view of a guide beam;

FIG. 6 is a front view of a guide beam;

DESCRIPTION OF THE PREFERRED EMBODIMENT

Figure 1:
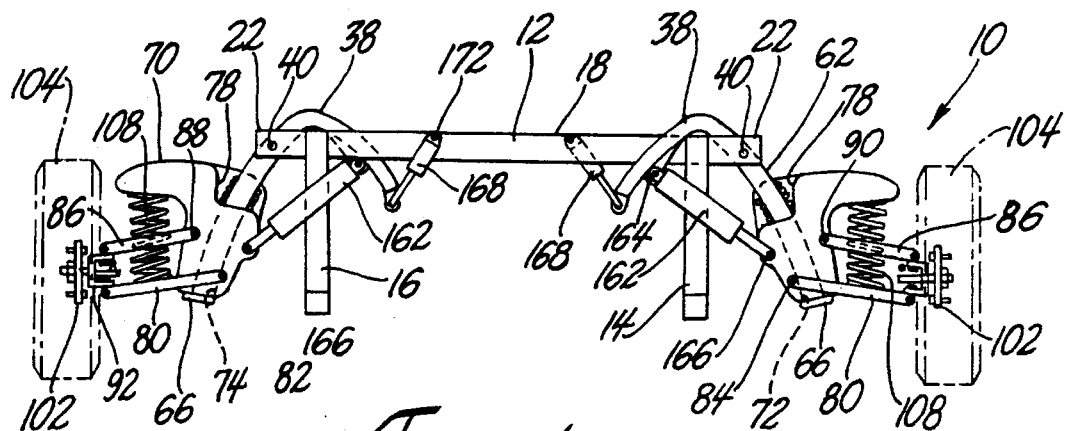
FIG. 1 is a front elevational view of a vehicle frame and the steered wheel support assemblies.

The vehicle stabilization system of this invention includes wheel support assemblies, generally designated 10, attached to a frame 12. The frame 12, as shown in FIGS. 3 and 4, has a left side rail 14, a right side rail 16, a primary front cross member 18, and a primary rear cross member 20. Additional cross members 22 and 24 are provided as required. The side rails 14 and 16 each include integral front bosses 22 and 24 and a pair of rear bosses 26 and 28. The front bosses 22 and 24 and the rear bosses 26 and 28 include guide beam king pin retaining bores 30 and 32. The king pin retaining bores 30 and 32 have axes 34 that are horizontal and parallel to a central fore and aft axis 36 of the frame 12.

The side rails 14 and 16 are bowed upward in areas where the front bosses 22 and 24 and the rear bosses 26 and 28 are attached to raise the king pin retaining bores 30 and 32 to the desired elevation.

The frame 12 is shown in the drawing and described above as a separate unit that a vehicle body could be mounted upon. Racing vehicles generally have such a frame. However, the frame 12 could, if desired, be an integral part of a vehicle body. If the vehicle body formed the frame, the only part of the frame 12 as shown in the drawing that would be required is the bosses 22, 24, 26, and 28 or similar structures with guide beam king pin retaining bores 30 and 32.

Figure 2:
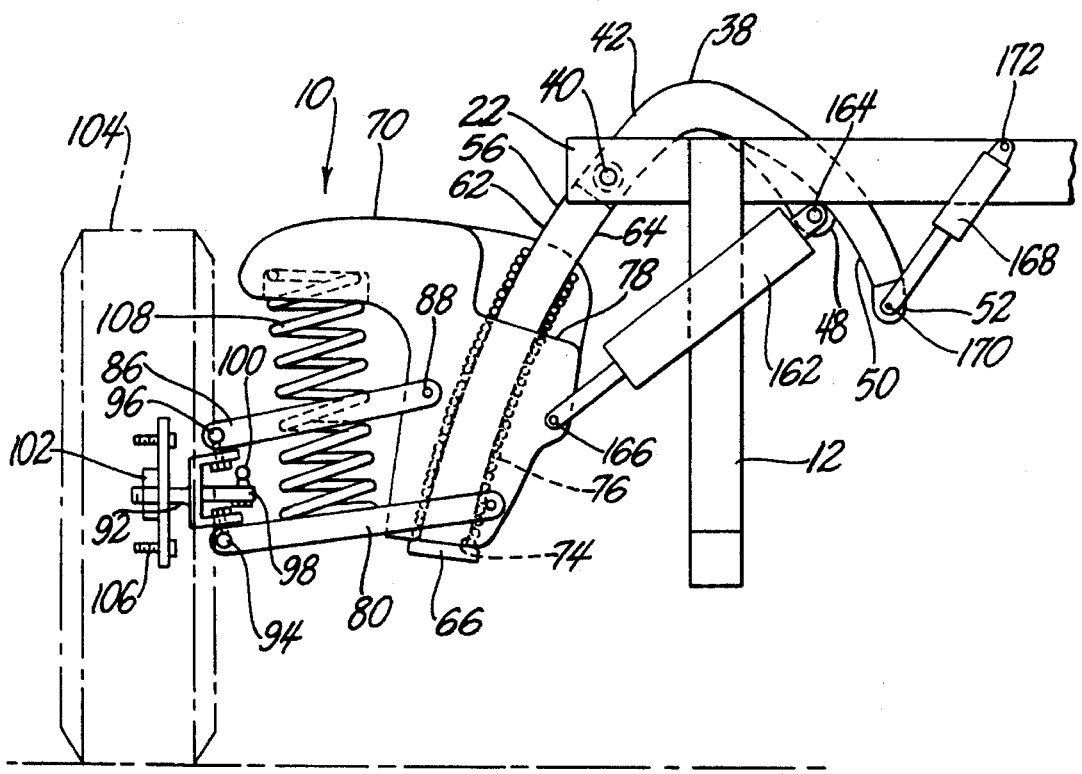
FIG. 2 is an enlarged front elevational view of one steered wheel support assembly.

The wheel support assemblies 10, as shown in FIGS. 1 and 2, include a guide beam assembly 38 that is pivotally attached to the frame 12 by a king pin 40. The king pin 40 is securely retained in a pair of king pin retaining bores 30 and 32. The guide beam assembly 38, as shown in FIG. 5 and 6, has a head portion 42 with a king pin passage 44. The king pin passage 44 is a machined passage in which the king pin 40 fits snugly. A first control arm 46 with a linear actuator attachment ear 48 is an integral part of the head portion 42. A second control arm 50 with a linear actuator attachment ear 52 is integral with the head portion 42 and offset to one end of the head portion. A pair of spaced apart parallel arcuate guide beams 54 and 56 are integral with the head portion and extend generally downward from the head portion 42. The guide beams 54 and 56 each have a rectangular cross section with straight sides 58 and 60 and arcuate sides 62 and 64. The arcuate sides 62 and 64 are arcs with a substantially constant radius of curvature. The arcuate sides 62 and 64 function as bearing surfaces as explained below. The straight sides 58 and 60 are guide surfaces. A stop plate 66 is attached to the lower free end of each of the guide beams 54 and 56. The rectangular cross sections of the guide beams 54 and 56 provide arcuate sides 62 and 64 with large bearing surface areas that reduce wear. However, it is believed that other cross sectional shapes including circular could be used if desired.

The transfer box 70 has two spaced apart passages 72 and 74. The passage 72 in the transfer box 70 receives the guide beam 54. The passage 74 in the transfer box 70 receives the guide beam 56. Roller bearings 76 are provided in the passages 72 and 74 to reduce friction between the passage walls and the arcuate sides 62 and 64 of the guide beams 54 and 56. Friction reducing coatings are available that could be applied in place of roller bearings 76. The cross sectional shape of the guide beams 54 and 56 could also be changed from rectangular to circular and linear bearings with ball returns could be used to reduce friction. Stop plates 66 are removed to slide the transfer box 70 on the guide beam assembly 38. Stop plates 66 are reattached to the guide beams 54 and 56 to retain the transfer box 70 on a guide beam assembly 38.

Recesses 78, shown in FIGS. 1 and 2, allow portions of the transfer box 70 to move in between a pair of bosses 22 and 24 or 26 and 28 to increase the range of movement of a transfer box 70 relative to a guide beam assembly 38.

A lower U-shaped yoke 80 is pivotally attached to the transfer box 70 by pivot fastener assemblies 82 and 84. The pivot fastener assemblies 82 and 84 allow the yoke 80 to pivot relative to the transfer box 70 about a horizontal axis. An upper U-shaped yoke 86 is pivotally attached to the transfer box 70 by pivot fastener assemblies 88 and 90. The pivot fastener assemblies 88 and 90 allow the yoke 86 to pivot relative to the transfer box 70 about a horizontal axis that is parallel to the axis about which the lower U-shaped yoke assembly 80 pivots. A steerable spindle assembly 92 is attached to the lower yoke 80 by a ball joint 94 and to the upper yoke 86 by a ball joint 96, as shown in FIGS. 1 and 2. A steering arm 98 is integral with the steerable spindle assembly 92. A ball connector 100 is secured to the free end of the steering arm 98. The steering linkage connects to the ball connector. The steering linkage is not shown in the drawing. A hub 102 is rotatably journalled on the spindle assembly 92. A tire and wheel 104, shown in phantom in FIGS. 1 and 2, is attached to the hub 102 by studs 106 and nuts. A brake system is not shown in the drawings, but would be connected to the spindle assembly 92 and to the hub 102. A single coil suspension spring 108 has its upper end seated in a pocket in the transfer box 70 and its lower end seated on the lower U-shaped yoke 80. A different suspension spring arrangement is required on wheel support assemblies 10 with a driven tire and wheel 104, as explained below.

Figure 7:
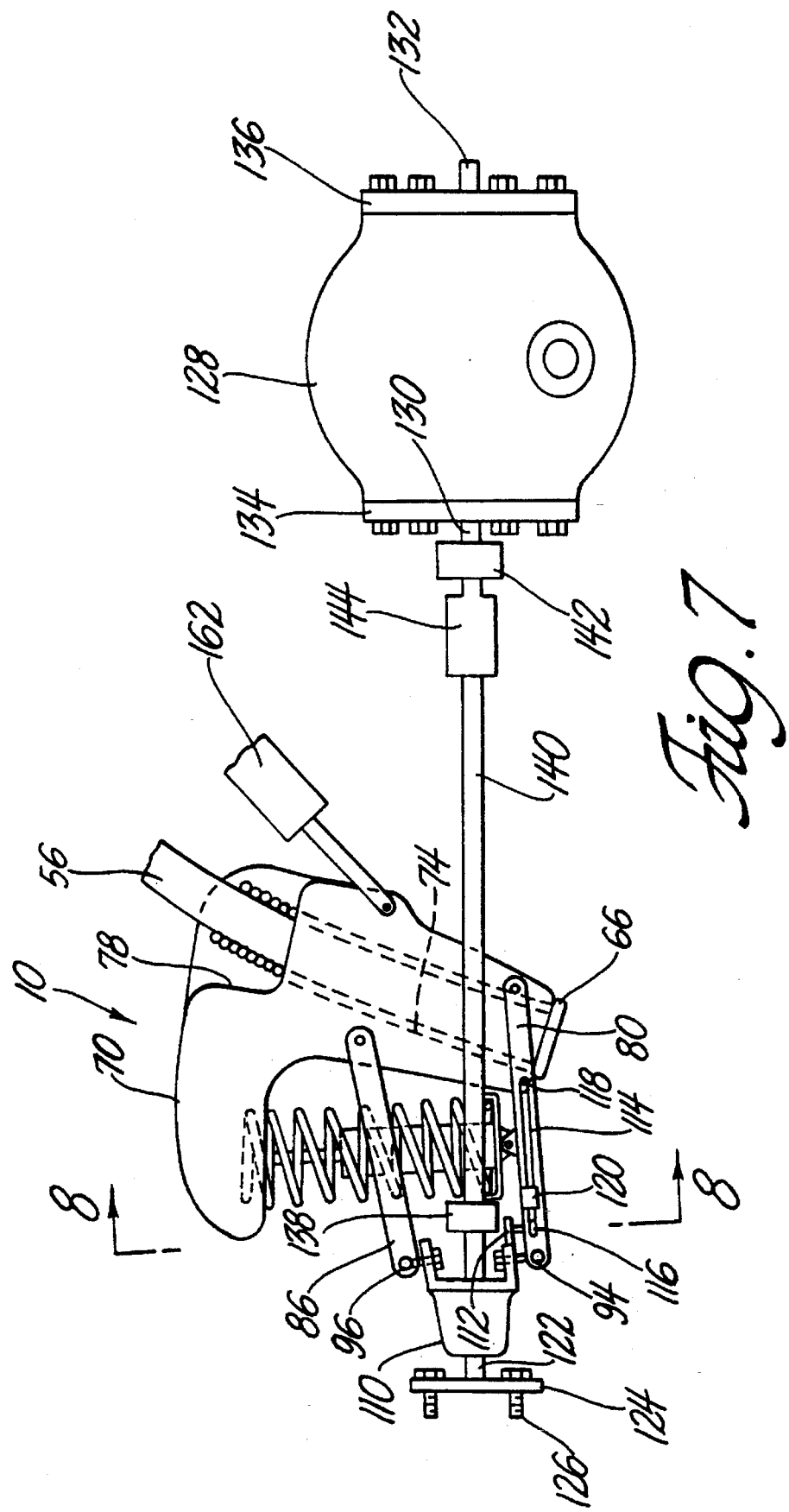
FIG. 7 is an enlarged front elevational view of one driven wheel support assembly with parts broken away.
Figure 8:
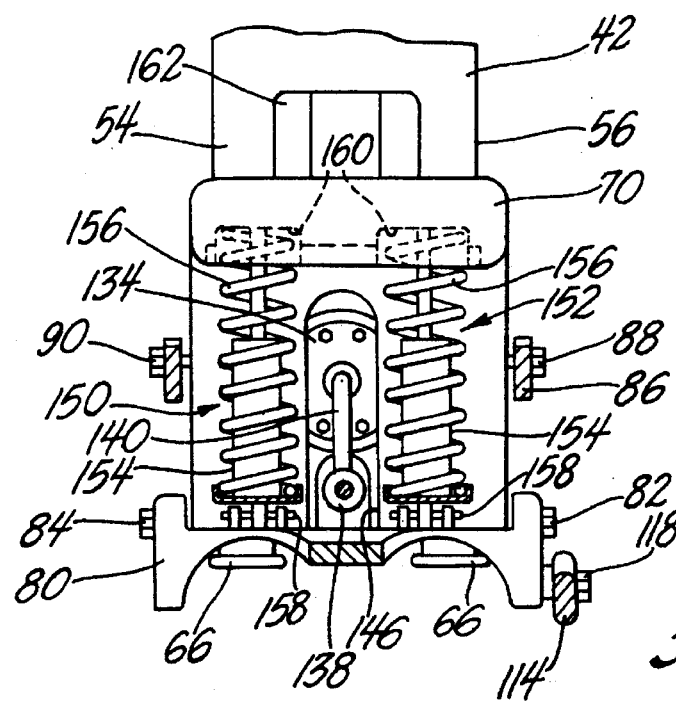
FIG. 8 is a sectional view taken along line 8—8 in FIG. 7.

A wheel suspension assembly 10 for a driven wheel and tire 104 is shown in FIGS. 7 and 8. The transfer box 70, the lower U-shaped yoke 80, the upper U-shaped yoke 86, and the ball joints 94 and 96 are identical to the corresponding parts described above and are designated by the same reference number. The steerable spindle assembly 92 for a steerable wheel is replaced by a spindle support hub 110. The spindle support hub 110 is secured to the lower yoke 80 and the upper yoke 86 by the ball joints 94 and 96. Since the hub 110 is not steerable an integral arm 112 on the hub is connected to one end of a link 114 by a ball joint 116. The other end of the link 114 is connected to the lower U-shaped yoke 80 by a pin and ball assembly 118. The link 114 includes a turn buckle 120 that permits adjustment of wheel alignment. A stub axle 122 with an integral wheel flange 124 and tire and wheel connector studs 126 is rotatably journalled in the spindle support hub 110 and axially fixed relative to the hub. A differential housing 128 is attached to the frame 12. The differential housing 128 has differential output shafts 130 and 132 extending from its opposite side plates 134 and 136. The stub axle 122 and the differential output shaft 130 are connected to each other by a constant velocity joint 138, a torque transmission shaft 140, and a constant velocity joint 142. The shaft 140 includes a slip joint 144 that accommodates changes in the length of the shaft.

The torque transmission shaft 140 passes between guide beams 54 and 56 of the guide beam assembly 38 and through a slot 146 in the transfer box 70, shown in FIG. 8. The shaft 140 cannot pass through a single coil suspension spring 108 described above and shown in FIGS. 1 and 2. A pair of spaced apart parallel strut assemblies, generally designated 150 and 152, replace the single coil spring 108, as shown in FIGS. 7 and 8. The strut assemblies 150 and 152 can take different forms. As shown, the strut assemblies 150 and 152 both include a piston and cylinder 154 pressurized by nitrogen and a coil spring 156 that surrounds the cylinder. The lower end of the cylinder 154 and the spring 156 is pivotally attached to the lower yoke 80 by pin 158. The upper end of the spring 156 and the piston rod of the piston and cylinder 154 extends into a recess 160 and the transfer box 70. The upper end of the spring 156 and the piston rod are preferably connected to the transfer box 70 by a pivot pin like the pin 158.

As described above, the vehicle has four tires and wheels 104. The front tires and wheels 104 are steered and the rear tires and wheels are driven. If desired, the front tires and wheels 104 could be driven and steered. If the front tires and wheels 104 were both driven and steered, it would be necessary to replace the coil suspension spring 108 with a pair of strut assemblies 150 and 152. It would also be possible, if desired, to drive all four tires and wheels 104 and to also steer all four wheels.

The transfer box 70 is moved vertically along the guide beams 54 an 56 of the guide beam assembly 38 by a hydraulic cylinder 162, as shown in FIG. 2. The head end of the cylinder 162 is attached to an attachment ear 48 on the beam assembly 38 by a pin 164. The rod end of the cylinder 162 is attached to the transfer box 70 by a pin 166. The cylinder 162 is preferably a double acting cylinder and raises and lowers the frame 12 relative to the tire and wheel 104 attached to the cylinder through the transfer box 70.

A double acting hydraulic cylinder 168 is attached to the attachment ear 52 on the second control arm 50 of the guide beam assembly 38 by a pin 170 and to a cross member of the frame 12 by a pin 172.

The control arm 50 is offset from the head portion 42 of the guide beam assembly 38 so that the hydraulic cylinder 168 does not interfere with other vehicle components. The hydraulic cylinder 168 is activated to pivot the guide beam assembly 38 about the axis of its kingpin 40 and to adjust the camber of a tire and wheel 104 that is connected to the guide beam assembly and transfer box 70 controlled by the cylinder.

The hydraulic cylinders 162 and 168 are both linear actuators. Other types of linear actuators could be used if desired. Pneumatic cylinders could be used or mechanical screws could be used. Mechanical screws could be turned by an electric motor or some other rotary actuator. It would also be possible to employ a rotary actuator in place of a linear actuator, if desired.

Figure 9:
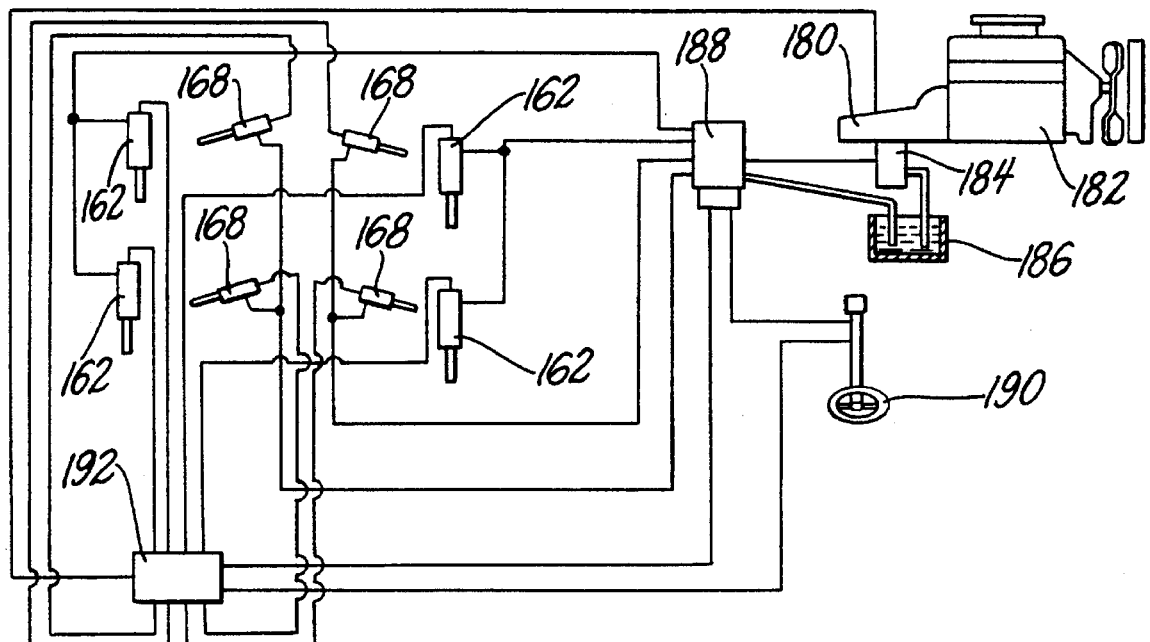
FIG. 9 is a control schematic for the vehicle stabilization system.

A control system is shown in FIG. 9. The control system is an example of one of many different control systems that could be employed. The control system as shown in FIG. 9 has been simplified for clarity. The system includes a transmission 180 driven by an internal combustion engine 182. The transmission 180 drives a pump 184. The pump 184 draws fluid from a sump 186 and supplies the fluid to a control valve 188 under pressure. The control valve 188 selectively directs fluid from the pump to and from the cylinders 162 on the right hand side of the vehicle and to and from the cylinders 162 on the left hand side of the vehicle to tilt the frame. The control valve 188 also selectively directs fluid from the pump to and from the cylinders 168 on the right hand side of the frame and to and from the cylinders 168 on the left hand side of the frame to adjust the camber of the wheels and tires 104 on both sides of the vehicle.

The control valve 188 could be controlled manually by a vehicle driver. The control valve can also be controlled by the position of the vehicle steering wheel 190. A third control system includes an electric control module 192 that can sense the position of the pistons in the hydraulic cylinders 162 to determine the tilt angle of the frame and adjust camber as required by directing fluid to and from the camber control cylinders 168. The electronic control 192 is also connected to position sensors associated with the camber control cylinders 168 to provide signals that indicate wheel and tire camber for each wheel and tire. Electronic control module 192 can be provided with a microprocessor that senses vehicle speed from the transmission 180, senses the position of the steering wheel and then supplies fluid from the pump 184 to the cylinders 162 to tilt the frame as required. The electronic control 192 could lower the frame 12 on one side and simultaneously raise the frame on the other side to obtain the desired tilt angle. The electronic control 192 could also lower and raise the frame 12 as desired. Fluid returned to the control valve 188 is directed to the sump 186.

The cylinders 162 and 168 are double acting cylinders. The schematic shown in FIG. 9 does not show the second fluid supply line connected to each cylinder and to the control valve 188. In some cases, a single line supplies fluid to two cylinders 168 or 162. Flow dividers would be required to divide the flow between the two cylinders.

During operation of a vehicle with the wheel support assemblies 10 described above, the vehicle frame would normally be in a raised position with all four transfer boxes 70 against stop plates 66. Upon starting a turn to the left, the hydraulic cylinders 162 on the left hand side of the vehicle frame 12 are retracted to lower the left hand side of the frame 12 and tilt the vehicle frame toward the inside of a turn. The radius of curvature of the arcuate guide beams 54 and 56 can be chosen so that pivoting the vehicle frame 12 about the point of contact between the center of the tire treads on the right hand side of the vehicle does not change the camber of the tires and wheels 104 on the left hand side of the vehicle. With the radius of curvature so chosen, as the frame is lowered on the left hand side, the cylinders 168 controlling the tires and wheels on the right hand side of the frame are retracted so that the tires and wheels maintain the desired camber. At the end of a turn, the steered wheels are turned to return to travel in a straight line. The hydraulic cylinders 162 on the left hand side of the vehicle frame are extended to raise the left hand side until the frame is level and the cylinders 168 on the right hand side are extended to maintain the desired camber. A turn to the right would result in lowering the right hand side of the frame 12 and adjusting the camber of wheels and tires 104 on the left hand side. The procedure is the same as explained above if right is exchanged for left and left is exchanged for right. The control valve 188 that controls the flow of fluid to and from the cylinders 162 and 168 can be controlled by the position of the steering wheel 190 if desired. A separate manual control could also be provided. A manual control would make it possible to start tilting the frame before entering a turn.

The cylinders 162 could all be retracted and the frame 12 could be in a lowered position when traveling in a straight line. When making a left hand turn in this mode, the frame 12 would be raised on the right hand side and camber would be adjusted on the left hand side.

The above operating descriptions have assumed that a radius of curvature of the guide beams 54 and 56 has been employed that permits a transfer box 70 to be moved in either direction relative to the guide beam assembly 38 without changing the camber of the tires and wheels 104 mounted on that particular transfer box. If a different radius of curvature of the guide beams 54 and 56 is employed, the camber of the tires and wheels 104 should be adjusted when the frame is tilted.

An electronic controller 192 could be provided which would automatically adjust the camber of the wheels and tires 104 on both sides of the frame 12 based on the tilt of the frame to one side or the other. The tilt of the frame 12 could be determined by measuring or sensing the position of the pistons in the cylinders 162.

An electronic system could control the actuators 162 to raise the frame on one side and lower the frame on the other side simultaneously. Such a system could include microprocessors programmed to regulate the degree of tilt based upon vehicle speed and the position of the steering wheel. It is assumed that as speed increases, the tilt of the frame should also increase. The electronic system would adjust camber of all the wheels as the frame is tilted.

Preferred embodiments of the invention have been described in detail but are examples only and the invention is not restricted thereto.

It will be easily understood by those skilled in the art that modifications and variations can easily be made within the scope of this invention.

I claim:

1. A method for shifting the center of gravity, during changes in the direction of movement, of a wheeled vehicle having a frame, a plurality of tires and wheels attached to and supporting said frame that are vertically shiftable relative to the frame and that are tiltable about a generally horizontal axis to adjust tire and wheel camber comprising the steps of: advancing the wheeled vehicle along a surface; shifting at least one of said tires and wheels on a first side of said vehicle vertically relative to the frame to tilt said frame and shift the center of gravity in the direction a vehicle is turned; and pivoting at least another one of said tires and wheels on a second side of said vehicle relative to said frame to adjust the camber of said another one of said tires and wheels that is pivoted relative to said frame to correct changes in camber that result from vertical shifting of said at least one of said tires and wheels on a first side of said vehicle.

2. A method for shifting the center of gravity during changes in the direction of movement, of a wheeled vehicle as set forth in claim 1, further comprising: shifting all of said tires and wheels on the first side of said vehicle vertically relative to said frame; and pivoting all of said tires and wheels on the second side of said vehicle relative to said frame to adjust the camber of each tire and wheel on the second side of said vehicle.

3. A method for shifting the center of gravity, during changes in the direction of movement, of a wheeled vehicle, as set forth in claim 2 further comprising the steps of: pivoting all of said tires and wheels on the first side of said vehicle relative to said frame to adjust the camber of each tire and wheel on the first side of said vehicle to correct changes in camber that result from camber adjustment of each tire and wheels on the second side of said vehicle.

4. A method for shifting the center of gravity, during changes in the direction of movement, of a wheeled vehicle, as set forth in claim 1 further comprising the steps of: shifting the at least one of said tires and wheels on said first side of said vehicle vertically relative to said frame to level said frame at the end of a turn and a return to movement in a straight line; and pivoting the at least another one of said tires and wheels on the second side of said vehicle relative to said frame to readjust the camber of the another one of said tires and wheel that is pivoted relative to said frame to the proper position for travel in a straight line with a level frame.

5. A method for shifting the center of gravity, during changes in the direction of movement, of a wheeled vehicle having a frame, a plurality of transfer boxes attached to the frame and moveable relative to the frame and a wheel and tire attached to and supporting each transfer box comprising the steps of: moving at least one of said transfer boxes on a first side of said vehicle vertically relative to said frame to cause the frame to tilt and move the center of gravity; and pivoting at least one of said transfer boxes on a second side of said vehicle relative to said frame to adjust the camber of the tire and wheel attached to the at least one of said transfer boxes on the second side of said vehicle that is pivoted relative to said frame.

6. A method for shifting the center of gravity, during changes in the direction of movement, of a wheeled vehicle as set forth in claim 5 further comprising moving all the transfer boxes on the first side of said vehicle vertically relative to said frame; and pivoting all of the transfer boxes, on the second side of said vehicle, relative to said frame to adjust the camber of each tire and wheel attached to the transfer boxes on the second side of said vehicle.

7. A method for shifting the center of gravity, during changes in the direction of movement, of a wheeled vehicle as set forth in claim 6 further comprising pivoting all of the transfer boxes, on the first side of said vehicle, relative to said frame to adjust the camber of each tire and wheel on the first side of said vehicle to correct changes in camber that result from camber adjustment of each tire and wheel attached to the transfer boxes on the second side of said vehicle.

8. A method for shifting the center of gravity, during changes in the direction of movement, of a wheeled vehicle as set forth in claim 5 further comprising pivoting at least two of the plurality of transfer boxes relative to said frame to adjust the camber of the tires and wheels attached to each transfer box that is pivoted.

9. A method for shifting the center of gravity, during changes in the direction of movement, of a wheeled vehicle as set forth in claim 5 wherein the vehicle has at least four transfer boxes attached to the frame and at least four tires and wheels, each of which is attached to and supports one of said transfer boxes and further comprising the steps of: moving all of said transfer boxes on the first side of the frame vertically relative to said frame to tilt the frame and move the center of gravity; and pivoting all of the transfer boxes on the second side of said frame to adjust the camber of the tires and wheels attached to each of the transfer boxes on the second side of said frame and correct changes camber that result from vertical shifting of all said transfer boxes on the first side of the frame.

10. A method for shifting the center of gravity, during changes in the direction of movement, of a wheeled vehicle as set forth in claim 9 further comprising the step of pivoting all of the transfer boxes on the first side of the frame to adjust the camber of the tires and wheels attached to the transfer boxes on the first side of the said frame.

11. A method for shifting the center of gravity, during changes in the direction of movement, of a wheeled vehicle as set forth in claim 5, further comprising the step of: moving all of said transfer boxes on the first side of said frame vertically upward relative to said frame to lower said first side of said frame when the first side of the frame is on the inside of a turn.

12. A method for shifting the center of gravity, during changes in the direction of movement, of a wheeled vehicle as set forth in claim 5 further comprising the step of: moving one or more of said transfer boxes relative to the frame to level the frame at the completion of a turn.

13. A wheeled vehicle including a frame with a frame axis that is generally parallel to the straight line direction of travel of the vehicle; a first generally vertical guide beam pivotally attached to said frame for movement about an axis that is generally parallel to the frame axis; a first transfer box secured to the first guide beam for limited movement along a portion of the length of the beam; an actuator connected to the first transfer box; a first rotatable tire and wheel connected to the first transfer box by a suspension system; and wherein the actuator connected to the first transfer box is operable to move the first transfer box along the portion of the length of the generally vertical guide beam to raise and lower a portion of said frame; and a pivot actuator connected to the first guide beam and to the frame; and wherein the pivot actuator connected to said frame and to the first guide beam is operable to pivot the guide beam relative to said frame and adjust the camber of the tire and wheel connected to said transfer box on said generally vertical guide beam.

14. A wheeled vehicle as set forth in claim 13 including a second generally vertical guide beam attached to said frame on the same side of the frame axis as the first generally vertical guide beam; a second transfer box secured to the second guide beam for limited movement along a portion of the length of the second beam; an actuator connected to the second transfer box; a second rotatable tire and wheel connected to the second transfer box by a suspension system; and wherein the actuators connected to the first and second transfer boxes are operable to tilt said frame to one side.

15. A wheeled vehicle as set forth in claim 13 further including a second generally vertical guide beam pivotally attached to said frame on the same side of the frame axis as said first guide beam, a second pivot actuator connected to said frame and to the second guide beam, a second transfer box secured to the second guide beam for movement along a portion of the length of the second guide beam, a second actuator connected to the second transfer box, and a second rotatable tire and wheel connected to the second transfer box by a second suspension system; a third generally vertical guide beam pivotally attached to the opposite side of said frame and directly across from the first guide beam, a third pivot actuator connected to the said frame and to the third guide beam, a third transfer box secured to the third guide beam for movement along the portion of the length of the third guide beam, a third actuator connected to the third transfer box, and a third rotatable tire and wheel connected to the third transfer box by a third suspension system; a fourth generally vertical guide beam pivotally attached to the opposite side of said frame and directly across from the second guide beam, a fourth pivot actuator connected to said frame and to the fourth guide beam, a fourth transfer box secured to the fourth guide beam for movement along a portion of the length of the fourth guide beam, a fourth actuator connected to the fourth transfer box, and a fourth rotatable tire and wheel connected to the third transfer box by a fourth suspension system; and wherein the actuators connected to the transfer boxes are operable to move the frame vertically and the pivot actuators connected to said frame and to the guide beams are operable to adjust wheel and tire camber.

16. A wheeled vehicle as set forth in claim 15 wherein the four generally vertical guide beams are arcuate.

17. A wheeled vehicle as set forth in claim 16 wherein the first and second guide beams have a radius of curvature that permits the first and second transfer boxes to be moved vertically without significantly changing the camber of the tires and wheels attached to the first and second transfer boxes.

18. A wheeled vehicle as set forth in claim 16 wherein the third and fourth guide beams have a radius of curvature that permits the third and fourth transfer boxes to be moved vertically without significantly changing the camber of the tires and wheels attached to the third and fourth transfer boxes.

19. A wheeled vehicle including a frame with a frame axis that is generally parallel to the straight line direction of travel of the vehicle; a first generally vertical guide beam attached to said frame; a first transfer box secured to the first guide beam for limited movement along a portion of the length of the beam; an actuator connected to the first transfer box; a first rotatable tire and wheel connected to the first transfer box by a suspension system; the actuator connected to the first transfer box is operable to move the first transfer box along the portion of the length of the generally vertical guide beam to raise and lower a portion of said frame; and wherein the first generally vertical guide beam includes an arcuate portion that is an arc about point on the opposite side of the frame and the first transfer box is movable along the arcuate portion.

* * * * *